Feb. 17, 1953

R. E. PAYNE 2,628,787

APPARATUS FOR ANALYZING THE PARTICLE
SIZE DISTRIBUTION OF A POWDER SAMPLE

Filed Sept. 2, 1947

INVENTOR.
ROBERT E. PAYNE
BY
Hugo G. Kemman

Feb. 17, 1953    R. E. PAYNE    2,628,787
APPARATUS FOR ANALYZING THE PARTICLE
SIZE DISTRIBUTION OF A POWDER SAMPLE
Filed Sept. 2, 1947    2 SHEETS—SHEET 2

INVENTOR.
ROBERT E. PAYNE
BY
Hugo G. Kemman

Patented Feb. 17, 1953

2,628,787

UNITED STATES PATENT OFFICE 2,628,787

APPARATUS FOR ANALYZING THE PARTICLE SIZE DISTRIBUTION OF A POWDER SAMPLE

Robert E. Payne, Bywood, Upper Darby, Pa., assignor to The Sharples Corporation, a corporation of Delaware Application September 2, 1947, Serial No. 771,631

6 Claims. (Cl. 241—39)

This invention relates generally to a method and apparatus for analyzing and determining the particle size distribution of powdered or finely divided materials by indicating the rate of fall in a gaseous medium of particles of a powder sample and more particularly to feed devices for introducing the powder sample to be analyzed into the apparatus.

The present application for patent is a division of my copending patent application Serial No. 768,907, entitled Sedimentation Tower, and filed August 15, 1947, now Patent No. 2,597,899, issued May 27, 1952.

A method and apparatus for determining particle size distribution of finely divided or powdered materials is known. The prior art device for such purpose employs the principles of Stokes law to determine particle size distribution by observing the rate of fall and percentage amount of particles having that rate of fall of a sample of powder initially dispersed in a liquid medium. Such liquid sedimentation devices, as they are known, are enabled to produce useful results but are not completely satisfactory in view of a number of inherent difficulties encountered when endeavoring to measure the rate of fall in a liquid medium. One difficulty is the relatively long period of time necessary for all of the particles dispersed in a liquid medium to settle which therefore prevents a rapid determination of particle size distribution. Another difficulty with the liquid sedimentation apparatus is the tendency of the dispersed particles to aggregate into larger size units. In addition they may stick to the side walls of the liquid sedimentation tank for a time and then be released through the action of fluid currents or mechanical disturbances so as to give an incorrect value of particle size. Still another difficulty with liquid sedimentation devices for measuring particle size distribution is the disturbing effect of undesired fluid currents introduced into the liquid medium such as convection currents or currents resulting from the movements of a collecting pan or from outside vibrations affecting the liquid containing tank.

It is a principal object of this invention to provide novel feed apparatus for introducing and dispersing in deaggregated form a powder sample into a form of gaseous sedimentation apparatus for measuring the particle size distribution of finely divided materials such as the sedimentation tower described in my copending patent application of which this application is a division.

Another object of this invention is to make possible the continuous observation of the percentage of particles having a given rate of fall under any desired conditions of fluid pressure or viscosity consistent with a desired maximum rate of fall for the largest expected particles of any powder sample.

Still another object of this invention is to provide an improved apparatus for the determination of particle size distribution by indicating the rate of fall and percentage of particles having that rate of fall in a gaseous medium such as air under controlled conditions of viscosity, the apparatus being relatively immune to the disturbing effects of fluid currents or vibrational influences and the difficulties arising from the aggregation or reaggregation of the particles initially dispersed in the gaseous medium before they are settled upon the collecting element.

The gaseous sedimentation apparatus as described in the aforesaid copending patent application in its principal embodiment may be briefly described as comprising an enclosure having a vertically extending tube or tower. The enclosure may be constructed of suitable materials such as steel or the like in a manner to be substantially pressure tight. Suitable valve structures and pressure-indicating devices may be provided in association with the enclosure and vertically extending tank to control, maintain and indicate the gaseous pressure or viscosity conditions within the enclosure either at atmospheric, subatmospheric or super atmospheric conditions. According to this invention, novel means is also provided in association with the tower to introduce and disperse within the tower in deaggregated form the sample of powder or finely divided material to be analyzed by sedimentation within the tower in a manner not to disturb the desired condition of viscosity of the gaseous medium within the tower.

A collecting means, which may preferably be a weighing pan, is disposed in the bottom of the tower within the enclosure in a manner to receive all of the particles settling through the tower. The collecting means is fastened to one end of a lever arm which may be, if desired, pivoted at or near its center of gravity in any suitable manner such as by a substantially frictionless torsion wire or reed pivot and completely self-contained within the pressure-tight enclosure. The other or opposite end of the lever arm may be provided with means to impose a restoring torque or counter torque on the lever arm to maintain equilibrium of the lever arm as the initial torque due to the weight of powder accumulating on the collecting means increases.

As more particularly described in the above-mentioned copending application, the restoring torque is applied to the lever arm by electrical means so that the electrical signal necessary to produce a restoring torque sufficient to maintain equilibrium of the balance arm is proportional to the amount of powder or particles accumulating on the collecting means. The electric signal indicating means may be positioned exteriorly of the pressure-tight enclosure and is usually calibrated arbitrarily, since the information desired to be obtained from the apparatus is of a relative nature to indicate the percentage of particles fallen upon the collecting element at any given time from zero time to the time when all particles have fallen and no further change in weight of the collecting element is observed. If desired, automatic continuous recording means of well known design may be used to record the value of the electric restoring torque signal.

In order to apply automatically the electrical restoring torque to the lever arm, in accordance with variations in weight of the collecting means, a combined optical and photo-electric system for converting mechanical movement of the lever arm into electrical energy together with relay or amplifying means for applying such electrical energy to an electro-magnetic coil in the manner of a servo system may be used. Alternatively, means may be employed to convert the mechanical movement of the lever arm into electrical energy such as a resistance or capacity bridge, an electro-magnetic coil system, or a system of piezo-electric crystals, it being understood that the electric energy thus generated or obtained is relayed to an electro-magnetic restoring torque coil in a manner to maintain the equilibrium of the lever arm as the particles collect upon the collecting means.

In practicing the gaseous sedimentation method described in the aforementioned copending patent application, the sedimentation tower is usually operated with air as the gaseous medium, although it should be apparent that other gases may be used if desired. The temperature and pressure conditions of the gaseous medium are noted in order to determine its viscosity for use in applying the principles of the general settling law or in special cases Stokes' law to translate the meter readings into particle size distribution. The pressure of the gaseous medium may be controlled to provide a desired viscosity which controls the settling rate of any given powder sample to be tested. Normal temperature variations of the gaseous medium have very little effect on its viscosity and may for most practical purposes be ignored. By using the novel apparatus of this invention, the powder sample to be tested is preferably introduced and dispersed in the form of a small cloud of deaggregated particles at the top of the tower coincidental with the establishment of zero time for the observations to be recorded. If the tower is being operated under atmospheric conditions of pressure, the powder sample may be introduced and projected by a small jet of air, although under sub-atmospheric conditions it is preferable that the powder sample be mechanically projected into the top of the tower in order to produce the desired cloud of particles at the top of the tower. If, however, the powder sample is introduced by a jet of air into the sedimentation tower under vacuum or sub-atmospheric conditions, the powder will be uniformly dispersed throughout the length of the tower and an additional graphical calculation from the observed results must be made as will be later described in detail.

The meter reading at zero time is recorded and subsequent meter readings at short intervals of time from the zero time are also recorded until no further changes in the meter readings are observed, thus indicating the complete settling of all particles of the powder sample. As mentioned before, a continuous recording meter may also be used to instantaneously record meter readings versus time from zero time. In any event, the meter readings are then corrected to zero and normalized to thus be translated into percentage fall of the total sample of powder at any given time from zero time to the time when all particles have settled. The largest particle size settling upon the collecting element at any given time from zero time is given by Stokes' law for atmospheric pressure conditions in the settling tower and by the general settling law for any pressure including atmospheric pressure when the powder sample is introduced in the form of a small cloud at the top of the tower. Stokes' law is $$d = \sqrt{\frac{18 \zeta h}{Pgt}}$$

where $d$=particle diameter; $g$=acceleration of gravity; $\zeta$=viscosity of medium; $h$=height of settling column; $P$=true density of powder material, and $t$=time in seconds from zero time. The general settling law that may be used for any pressure of a gaseous medium in the settling tower is $$t = \frac{9}{2}\frac{Po}{P}\frac{\bar{u}h}{gd}\frac{1}{\left(a+\frac{d}{2L}+be-c\frac{d}{L}\right)}$$

where:

$t$=time to fall through distance $h$.
$d$=particle diameter.
$L$=mean free path of medium.
$\bar{u}$=mean molecular velocity of medium.
$Po$=density of medium.
$P$=true density of material from which powder is made.
$g$=acceleration of gravity.
$a, b, c$ are constants which depend on powder material and form to a slight extent. For most solid particles the following values may be used: $a=1.23, b=0.41, c=0.44$.
$e$=base of natural logarithms, constant 2.7182 . . .

By applying the appropriate one of the foregoing laws to the time and percentage data obtained from the sedimentation tower as previously described, a percentage weight of particles having a particle size smaller than a given particle size may be graphically plotted over the entire percentage range of particles so as to determine the particle size distribution of finely divided or powder materials.

Further objects and advantages of this invention will be apparent with reference to the following specification and drawings in which:

Figure 1 of the drawings is a diagrammatic illustration of a gaseous sedimentation apparatus showing the enclosed sedimentation tower having means to introduce and project the powder sample into the top of the tower, collecting means and associated lever arm together with the photo-electric system for translating movement of the lever arm into an electrical restoring torque signal indicative of the weight of particles collected;

Figure 8:
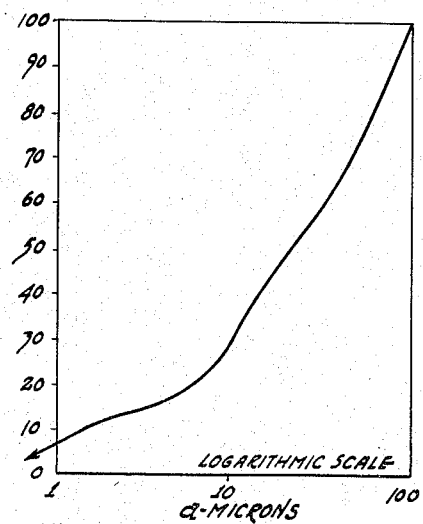
Figure 9:
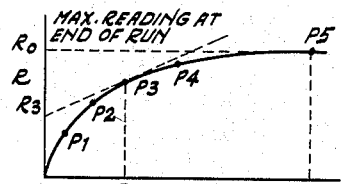

Figure 8 shows a typical curve of the results obtained by a test run of a gaseous sedimentation employing the feed devices of this invention for the analysis of the particle size distribution of silica powder, and Figure 9 is an illustration of a graphical method for computing the results recorded in the manner of Figure 8 when obtained by operating the sedimentation tower at sub-atmospheric pressure together with air feeding of the powder sample into the tower.

Figure 1:
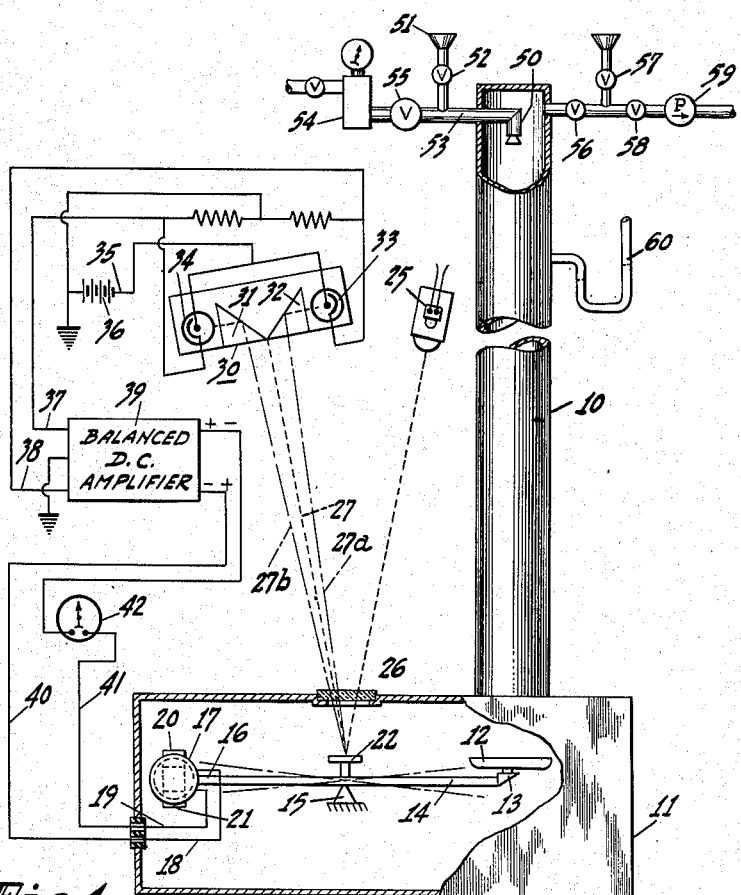

Referring to Figure 1 of the drawings wherein a gaseous sedimentation apparatus is diagrammatically shown, the completely enclosed sedimentation tower 10 of a known height is provided and may be constructed of suitable material, such as metal, in a manner to be pressure tight, as will be later referred to in detail. The bottom of the sedimentation tower enclosure 10 is enlarged, as shown at 11, to provide space for enclosing the weighing assembly including the collecting means 12 positioned to receive the particles settling through the tower 10. The collecting means 12 is mounted upon one end 13 of a lever arm 14 pivoted at the fulcrum 15. The opposite end 16 of the lever arm 14 is provided with a restoring torque coil of wire 17 having flexible electrical connections 18 and 19 passing through the housing 11 in pressure tight relation.

The restoring torque coil 17 is positioned with its axis in an approximate horizontal plane and its coil faces between the opposed and opposite polarity pole faces of a pair of permanent magnets, one of which is shown in Figure 1 to have the pole faces 20 and 21. Such an arrangement of permanent magnets and restoring torque coil functions as a servo system electric motor, as should be well understood. A light reflecting mirror 22 is mounted upon the lever arm 14 in the vicinity of the fulcrum 15 to be deflected with the lever arm 14 as it is moved toward either of the dotted line positions in response to the application of forces on the lever arm as will be described. It should be understood that the dotted line positions of the lever arm 14 are greatly exaggerated for purposes of illustrating the invention, since the amount of deflection of the lever arm 14, due to the accumulation of particles on the collecting means 12 is practically imperceptible except as may be detected by an automatically responsive servo system. Furthermore, the servo system to be described is adapted to supply an electrical signal to the electromagnetic coil 17 in a manner to apply a restoring torque to maintain equilibrium of the lever arm 14 as the weight of particles on the collecting means 12 increases and thus further limits the movement of the lever arm to be almost imperceptible.

In the diagrammatic illustration of one form of gaseous sedimentation system as shown in Figure 1, a light source 25 is adapted to project a beam of light through the transparent window or lens assembly 26 onto the light reflecting mirror 22, which reflects the beam of light 27, 27a or 27b, depending upon the equilibrium position of the lever arm 14 upon the photo-electric assembly 30. The relative positions of the light source 25 and the reflecting mirror 22 carried by the lever arm 14 may be such that when the lever arm 14 is in the horizontal equilibrium position, the reflected light beam 27 is evenly divided by the prisms 31 and 32 between the photo-electric cells 33 and 34. Upon movement of the equilibrium position for the lever arm 14 to a position other than the horizontal position, with such relative positioning of the light source 25 and reflecting mirror 22, either the photo-electric cell 34 or 33 will receive more light than the other as should be readily understood.

The photo-electric cells 33 and 34 are connected in a circuit with their anodes connected together and to the positive terminal 35 of a battery 36 or other suitable voltage source. The negative terminal of the battery 36 is grounded and connected to the mid point of a voltage divider connected across the respective cathodes of photo-electric cells 33 and 34. Thus, when the lever arm 14 is in the horizontal equilibrium position, the potentials at the respective cathodes of the photo-electric cells 33 and 34 may be equal so that the potentials in lines 37 and 38 connected to the input terminals of a balanced amplifier 39 are also equal with respect to ground. The balanced amplifier may be of any well-known type which will produce a voltage output of a polarity and amplitude relative to the potential difference in lines 37 and 38 as applied to its input terminals. The output voltage from the balanced amplifier 39 is connected by lines 40 and 41 to the electromagnetic coil 17 in a manner to create a magnetic field to interact with the field of the permanent magnets and apply a restoring torque on the end of the lever arm 14 to maintain its equilibrium as it is tended to move by the accumulation of particles on the collecting means 12. In effect, the amplifier 39 functions as an impedance matching device between the relatively high impedance of the photo cells and the low impedance of the restoring torque coil and supplies the necessary restoring torque power.

Although the electro-optical servo system as diagrammatically shown and described thus far is of the type in which the lever arm 14 may be balanced in the horizontal equilibrium position without the application of any electromagnetic restoring torque or energy in the coil 17, it should be apparent that the system is not necessarily limited to such an arrangement. For example, the fulcrum point 15 may be located at a position other than just above the center of gravity for the lever arm 14, in which case the servo system may be modified, as should be readily understood to provide a continuous restoring torque through the medium of the electro-magnetic coil 17 and associated permanent magnets to maintain the lever arm 14 in a desired equilibrium position at the start of a test run and during the subsequent accumulation of powder upon the collecting means 12.

A meter 42 may be provided in the output circuit of the amplifier 39 connected to the electro-magnetic restoring torque coil 17 to indicate the electrical energy proportional to such restoring torque automatically obtained in response to the tendency of movement of the lever arm 14 and thus indicate the amount of powder collected on the collecting means 12. The meter 42 may be of the micro-ammeter type connected in a manner to measure the current, but it should be understood that any type of device connected to measure electric current or voltage may be used to indicate the restoring torque energy. In any event, the meter may be calibrated arbitrarily from zero to 100, since its deflection is only an arbitrary indication of the amount or percentage weight of particles collected on the collecting means 12 at any interval of time from zero time to the time when all particles have fallen. The meter may also be calibrated directly in milligrams weight on collecting means, if so dersired. A continuous time recording meter of known design (not shown) may also be used in place of the meter 42, as has been previously mentioned.

At the top of the sedimentation tower 10 as diagrammatically shown in Figure 1, a powder feed means 50 for introducing and dispersing in deaggregated form a sample of powder to be analyzed is provided. The feed means 50, according to this invention, may have a number of modified structural forms and arrangements such as shown in detail by Figures 2 through 7 of the drawings, and, as shown diagrammatically in Figure 1, may be of the type employing a small jet of air to project the deaggregated particles of the powder sample into the top of the tower 10. The sample of powder to be analyzed may be placed within the funnel 51 to be passed through the valve 52 into the pipe line 53. A small volume of air contained in the small pressure chamber 54 under pressure may then be released by closing the valve 52 and opening the valve 55 to project the powder sample in the pipe line 53 through the slit orifice of the feed device 50 into the top of the sedimentation tower 10 to form a small cloud of dispersed particles. The feed device 50 is preferably provided with an orifice having a size equal to the largest particle size expected to be present in the powder sample and further having a structure such as to cause deaggregation of the powder sample as it is blown into the top of the sedimentation tower 10.

It may be desirable to operate the sedimentation tower under conditions of sub-atmospheric pressure in which case the valves 56, 57, 58 and pump 59 may be suitably manipulated in a known manner to control the pressure within the sedimentation tower 10, as indicated by any standard type of pressure or vacuum gauge 60. In place of the simple arrangement of valves 56, 57, 58 and pump 59, automatic pressure regulating systems of any suitable type may be used, as should be well understood, to maintain a desired condition of pressure within the sedimentation tower enclosure 10 and the enlarged bottom enclosure 11.

The operation of the gaseous sedimentation system thus far described is as follows. A sample of powder is blown into the top of the sedimentation tower 10 through the powder feed device 50, as previously described. Zero time for the observations to be recorded is established coincident with the time of introduction of the powder sample into the top of the tower. In accordance with the principles of the well-known settling law, the largest particles of powder will reach the collecting device 12 at the bottom of the tower 10 in a very short interval of time after zero time. Prior to the introduction of the powder sample into the top of the tower, the lever arm 14 is adjusted in a manner such as referred to in detail in the aforesaid copending patent application, to a condition of equilibrium with the reflected light distributed upon the photo cells 33 and 34 to cause a full-scale or approximately full-scale meter deflection by the meter 42 and a consequent amount of electromagnetic restoring torque by the coil 17 assisting in maintaining the equilibrium of the lever arm 14. As the first particle is collected by the collecting device 12, the equilibrium of the lever arm 14 tends to be disturbed, causing a shift in light distribution on the photo cells 33 and 34 so that the electrical energy output of the balanced amplifier 39 is changed to produce a corresponding change in the restoring torque of coil 17 to maintain the lever arm 14 in equilibrium for the new condition of weight on the collecting device 12. The change in electrical energy is indicated by the meter 42 and may be recorded along with the time lapse from the zero time at which the meter change occurs. Subsequent particles falling upon the collecting device 12 cause subsequent changes in the meter readings and restoring torque and by plotting the meter readings versus time and normalizing the meter readings, such as in a manner to be hereinafter described, a percentage weight indication of particles falling upon the collecting device 12 will be obtained. At some subsequent time from the zero time, a condition will be reached at which the meter deflection no longer changes, which is an indication that all of the particles of the powder sample initially dispersed in the top of the tower have fallen and collected upon the collecting device 12. A specific example of a powder sample test run employing the method and apparatus of this invention will be referred to later in connection with Figures 8 and 9 of the drawings.

Figure 2:
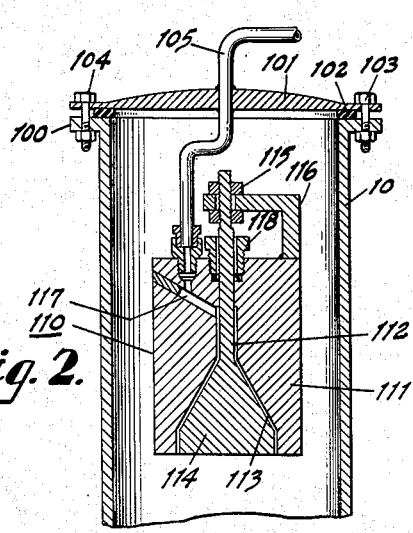
Figure 2 is an enlarged fragmentary partial section of the upper end of the sedimentation tower to show in detailed section one form of air feed device of the invention for projecting and dispersing the powder sample in deaggregated form within the top of the tower.
Figure 3:
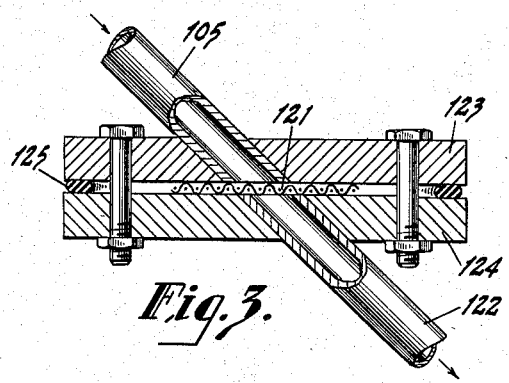
Figure 3 is a detail section of a modified form of air feed device employing a screen element for deaggregating the powder sample.
Figure 5:
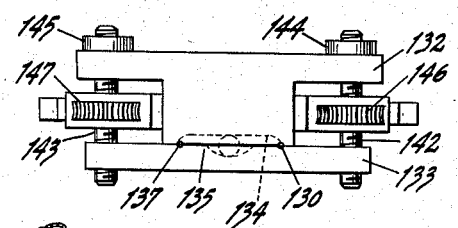
Figure 5 is an end view as seen from the bottom of Figure 4.
Figure 4:
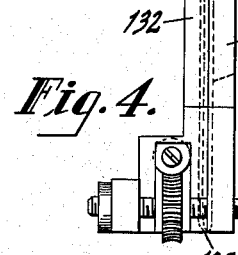
Figure 4 is a side elevation of still another form of air feed device having an adjustable slit opening through which the powder is adapted to be blown in deaggregated form into the top of the sedimentation tower.
Figure 6:
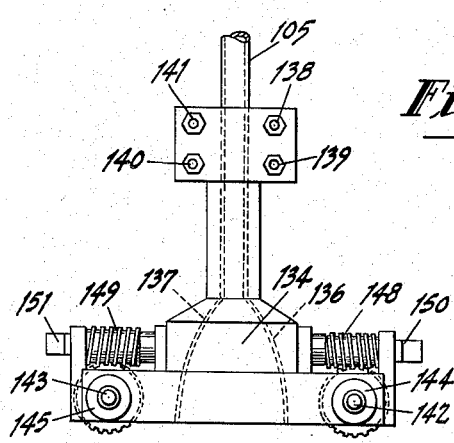
Figure 6 is a top plan view of the feed device shown in Figures 4 and 5.

Referring to Figure 2 of the drawings, one form of air-operated feed device for introducing and dispersing in deaggregated form a sample of powder to be analyzed, is shown in detail. The top of the cylindrical sedimentation tower 10 is provided with a flange 100 upon which is seated a disc shaped end piece 101. To maintain the pressure tight relation within the tower 10 a rubber gasket 102 may be provided and a plurality of bolts such as 103 and 104 may be employed to assure a tight seating of the end piece 101 against the gasket 102 and flange 100. A tubular conduit 105 passes through the end piece 101 and is welded thereto in pressure tight relation. The conduit 105 is adapted to support within the upper end of the sedimentation tower 10 the feed device assembly 110.

The feed device 110 is comprised of a metallic block or body member 111 having the axial bore 112 enlarged at its lower end to form a conical opening 113 with the large end of the cone at the surface of the block and facing the interior of the tower 10. Within the bore 110 and conical opening 113 is positioned a closely fitting plug 114 of similar contour which may, if desired, be of slightly less dimensions. The plug 114 is held in assembled relation to the block 111 by the threaded nut 115 carried by the bracket 116. By adjusting the threaded nut 115 to move the plug 114 lengthwise of the conical opening 113, the dimensions of the slit orifice formed between the opposing conical surfaces of the conical opening 113 and the plug 114 may be correspondingly adjusted. The powder sample and accompanying air blast from the air storage chamber 54 shown in Figure 1 of the drawings is conveyed by gas pressure through the supporting conduit 105 into the passage-way 117, bored in the block 111 to connect with the orifice between the conical surface 113 and plug 114. In order to prevent the blast of powder and air from escaping around the upper end of the block 111, a packing nut 118 is provided. In employing this form of feed device, the nut 115 is adjusted to provide a clearance or orifice between the opposing conical surfaces of the feed device equal to or slightly larger than the largest expected particle size of the powder sample. The arrangement of conical surfaces within the feed device together with the use of an air blast to blow the powder through the feed device is effective to deaggregate and thoroughly disperse the powder sample in the form of a cloud within the top of the sedimentation tower 10 by breaking up the particle aggregates larger than the largest expected particle size equivalent to the width of the narrow dimension of the slit orifice.

An alternative type of feed device is shown in Figure 3 of the drawings. A mixture of air and powder sample is conveyed through the inlet tube 105 against a fine mesh screen 121 at an angle to the screen such that the smallest expected particle size cannot pass through the screen without striking a screen wire or cross member of the mesh. Therefore all particles and aggregates of particles must strike a cross wire of the screen 121 and be deflected and deaggregated to pass through the screen at right angles to the plane of the mesh screen into the outlet tube 122 and the top of the tower 10. The mesh screen 121 is interposed between the inlet tube 105 and the outlet tube 122 and may be clamped between a pair of plates 123 and 124 having a sealing gasket 125 to prevent the escape of air and powder around the edges of the plates 123 and 124. Such form of feed device is particularly suitable for use in feeding powder samples containing a large percentage of aggregates which must be deaggregated to prevent clogging in the small orifice feed device. Deaggregation is necessary in order to obtain accurate analytical results from the sedimentation tower. The mesh screen may preferably be of 200 mesh size, although such size is not a limitation since most of the smaller mesh screens presently available have screen openings considerably larger than the largest particle size to be passed in a given powder sample.

Yet another form of air feed device is shown in Figures 4 through 6 of the drawings. This form of air feed device may also be termed a slit feed, the width of the narrow dimension of the slit being determinate of the maximum particle size fed through the device. The conduit 105, in which is conveyed the mixture of sample powder and air under pressure, is clamped at 131 between the plate members 132 and 133 having cut-out or depressed portions in their opposed surfaces to form the passage-way 134. The passage-way 134 narrows down to a slit 135 at one end of the plates 132 and 133, as shown in Figures 4 and 5 of the drawings. The edges of the depressed surfaces and passage-way 135 are defined by the gaskets 136 and 137 which prevent the powder and air under pressure from escaping between the two plates 132 and 133 except at the slit opening 135. The width of the narrow dimension of the slit 135 is determined by the spacing between the opposed plates 132 and 133 which are tightly clamped together at the end adjacent the feed conduit 105 by means of the bolts 138—141. At the end of the plates 132 and 133 adjacent the slit opening 133, the spacing between the plates is determined by the adjustment of the studs 142 and 143. Studs 142 and 143 are provided with differentially threaded sections at each end, one section engaging corresponding threads in the lower plate 133 and the other section engaging a threaded collar 144 or 145 carried by the upper plate 132. The threaded sections at each end are in the same direction but one end has 50 threads per inch while the other end has 51 threads per inch giving a very high mechanical amplification of slit motion. Each of the studs 142 and 143 have keyed thereon a worm wheel 146 and 147 engaging worms 148 and 149 which may be rotated by the keyed shafts 150 and 151. It should be apparent that rotation of either worm 148 or 149 will adjust the spacing between the opposed plate surfaces 132 and 133 at the slit opening and thus regulate the width of the slit opening and the maximum particle size to be passed through the opening. The passage-way 135, shaped as shown in the dotted lines of Figures 4 to 6, is effective to disperse and deaggregate the powder sample in the form of a cloud within the top of the sedimentation chamber.

In the powder feed devices of this invention having slit orifices through which the powder sample is projected by a jet of air, examples of which have been described in connection with Figures 2 and 4 to 6 of the drawings, very effective deaggregation of the powder sample is primarily due to a viscous sheer force upon the particles as they pass through the high velocity stream of air in the slit which therefore may be larger in its narrow dimension than the largest expected particle size. The above will be better understood when it is pointed out that the movement of air in the center of the slit or orifice is of very high velocity while the air movement at the side walls of the orifice is substantially zero.

All of the forms of feed devices of this invention thus far described in connection with Figures 2 to 6 of the drawings employ a jet of air to project the powder sample into the top of the sedimentation tower. Under certain conditions of operation it might be undesirable to introduce the powder sample by means of a jet of air. For example, when the sedimentation tower is to be operated under conditions of vacuum, it is apparent that if the powder sample is introduced into the tower by means of a jet of air, the particles would uniformly distribute themselves throughout the tower from top to bottom at the instant of zero time before settling of the particles. While such a distribution would not prevent a determination of the particle size distribution, it would necessitate a graphical computation of the results obtained when the particles are so uniformly distributed throughout the tower instead of dispersed in the form of a cloud at the top of the sedimentation tower.

Figure 7:
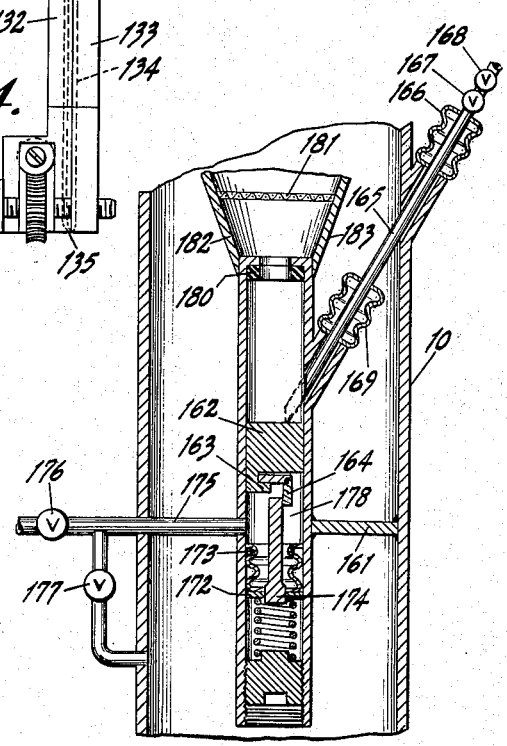
Figure 7 is a sectional view of an alternative mechanical feed device for projecting and dispersing the powder sample in deaggregated form into the top of a sedimentation tower, the feed device being particularly suitable for use in the gaseous sedimentation tower operated under sub-atmospheric pressure conditions.

An alternative mechanical feed device may be used to project the powder sample into the top of the tower in the form of a cloud of dispersed and deaggregated particles, without the introduction of an air blast into the tower and regardless of the pressure conditions within the tower. Such a mechanical form of feed projecting device is shown in Figure 7 of the drawings. A cylindrical tube or cylinder 160 is supported upon an arm 161 welded to the inner wall of the sedimentation tower 10 and is provided with an open end upwardly communicating with the interior of the tower 10. Since the feed device is adapted to project the powder sample upward, it may be positioned at any suitable point within the sedimentation tower 10 beneath the upper end of the tower. Reciprocally mounted within the cylinder 160 is a piston member 162 having a flanged latching surface 163 on its under side. Piston rings (not shown) may be provided to maintain a pressure tight fit between the piston 162 and the inner cylinder walls of the cylinder 160. A pivoted latch member 164 normally engages the latch flange 163, as shown, to prevent the piston 162 from moving upward within the cylinder 160.

A feed tube 165 is adapted to project through the outer wall of the sedimentation tower 10 with a flexible bellows or seal 166 and suitable valves 167 and 168 of the pressure locking type are provided to permit a powder sample to be introduced through the feed tube 165 onto the upper surface of the piston 162 without disturbing a pressure condition within the tower 10, as should be readily understood. The bottom end of the feed tube 165 is passed within the cylinder 160 above the upper surface of the piston 162 by means of the flexible bellows or seal 169. The provision of the flexible bellows 166 and 169 enables the feed tube 161 to be moved inward to the dotted line position to deposit the powder sample upon the center of the upper surface of the piston 162, after which the feed tube may be withdrawn to the solid line position to provide clearance for the piston 162 when it is moved upward within the cylinder 160.

The lower end of the cylinder 160 carries a compression spring 170 seated against an adjustable spring tensioning plug 171 threaded within the bottom portion of the cylinder 160. The upper end of the spring 170 seats against a disc portion 172 of a flexible bellows or seal 173 connected between the inner walls of the cylinder 160. The disc member 172 also carries a trigger element 174 normally engaging, as shown in the drawings, the dependent portion of the latch member 164 and preventing the latch member 164 from pivoting in a clockwise direction to release the piston 162 for axial movement upward within the cylinder 160. A conduit 175 is provided with associated valves 176 and 177 to admit air under pressure into the cylinder chamber 178 defined by the bottom surface of the piston 162 and the flexible bellows and disc member 173 and 172, respectively. When the valve 176 is manipulated to admit air under pressure into the chamber 178, the bellows 173 is moved against the force of the compression spring 170 until the air pressure exceeds the tension of the spring and the trigger member 174 is moved to release the latch 164 for pivotal movement in a clockwise direction. The air pressure within the chamber 178 thus controlled by the tension of the spring 170 is then operative to force the piston 162, now released for axial movement by the clockwise pivotal movement of the latch 164, to move axially upward within the cylinder 160 with considerable velocity. At the upper end of the cylinder 160, the piston strikes the rubber gasket and shock absorbing ring 180 and flings the powder sample on its upper surface upward through the mesh screen 181 toward the top of the tower. The mesh screen 181 is supported on a number of bracket arms, such as 182 and 183 and functions to deaggregate the powder sample as it is projected upward into the top of the sedimentation tower 10. By closing valve 176 and opening valve 177 the air pressure within the chamber 178 may be released to allow the piston 162 to fall by gravity and reset the trigger mechanism including the pivoted latch 164 for a subsequent feed of a powder sample.

The following results may be given as an example of one test run of gaseous sedimentation apparatus when employing an air feed device of this invention, such as shown and described in connection with Figure 2 of the drawings. The results tabulated below were obtained by initially adjusting the position of the lever arm 14 to cause full scale meter deflection. The test run was made at atmospheric pressure and was continued for a time duration of 85,800 seconds (longer than usually needed for most powder samples) at which time no further meter deflection was observed, thus indicating complete settling of all powder particles. The meter readings were corrected to zero and normalized to indicate percentage weight, as shown in the tabulations listed below. The maximum particle size for listed percentage weights at specified time intervals from zero time were computed by Stokes' law, since the gaseous medium in the tower was maintained at atmospheric pressure during the test run.

| Time, Seconds | Meter Reading | Subtract to 6.3 to Correct to 0 | Divide by 93.7 to Correct to 100% (Normalization) | Compute by Stokes' Law Diameter from Time, d-microns |
|---|---|---|---|---|
| | | | Percent wt. finer than d | |
| 0 | 100 | 93.7 | 100 | ∞ |
| 4 | 95 | 88.7 | 94.6 | 87 |
| 8 | 80 | 73.7 | 78.6 | 61.5 |
| 13 | 70 | 63.7 | 68.0 | 48 |
| 20 | 65 | 58.7 | 62.6 | 39 |
| 34 | 60 | 53.7 | 57.3 | 30 |
| 53 | 55 | 48.7 | 52.0 | 24 |
| 84 | 50 | 43.7 | 46.6 | 19.2 |
| 133 | 45 | 38.7 | 41.3 | 15.2 |
| 192 | 40 | 33.7 | 36.0 | 12.6 |
| 285 | 35 | 28.7 | 30.6 | 10.3 |
| 433 | 30 | 23.7 | 25.3 | 8.4 |
| 748 | 25 | 18.7 | 20.0 | 6.4 |
| 1,213 | 22.5 | 16.2 | 17.3 | 5.0 |
| 2,550 | 20 | 13.7 | 14.6 | 3.45 |
| 6,9000 | 17.5 | 11.2 | 12.0 | 2.11 |
| 10,800 | 16.2 | 9.9 | 10.6 | 1.67 |
| 17,000 | 13.7 | 7.4 | 7.9 | 1.33 |
| 21,000 | 12.0 | 5.7 | 6.1 | 1.20 |
| 27,500 | 11.0 | 4.7 | 5.0 | 1.05 |
| 85,800 | 6.3 | 0 | 0.0 | 0.59 |

The above results may be graphically represented by a curve, as shown in Figure 8 of the drawings. In such graphical representation, the particle size diameter $d$ in microns is plotted along the abscissa with small particle sizes to the left, while the percentage weight of particles having a diameter finer than $d$ is plotted along the ordinate with zero percentage at the bottom.

As has been previously described, it may be desirable to shorten the length of time necessary for all of the particles in the powder sample to settle, by operating the tower under subatmospheric conditions of pressure. Under such conditions of operation it is necessary when computing the particle size diameter in microns for a given time lapse from zero time to use the general settling law instead of the simplified Stokes' law, which is true only for atmospheric conditions of pressure. It is preferable to employ the mechanical feed device shown and described in connection with Figure 7 of the drawings when operating a gaseous sedimentation tower under sub-atmospheric conditions of pressure so that a cloud of dispersed particles of the powder sample may be formed at the top of the tower. However, when operating the tower under sub-atmospheric conditions of pressure, an air feed device may be employed in which case the powder sample is substantially uniformly distributed throughout the settling tower coincident with zero time and therefore making it necessary to compute and correct the results for such particle distribution graphically. In Figure 9 of the drawings the graphical computation and correction method is illustrated wherein the diameter of the particles as determined from the general settling law is plotted along the abscissa starting with zero at the left and the arbitrary corrected meter readings for the corresponding particle sizes are plotted along the ordinate starting with zero meter reading at the bottom. The true percentage values may then be obtained by constructing tangents to the curve representing pairs of meter readings and diameters. The intercept of the tangent on the ordinate will then indicate the true percentage weight of powder having the particle size finer than the size $d$ indicated at the tangent point on the curve. For example, at a point $P_3$ on the curve representing a particle size $d_3$ a tangent is drawn to intercept the axis at the point $R_3$. Percentage weight $W_3$ will then be obtained by the following formula:

$$\%W_3 = 100\left(1 - \frac{R_3}{R_0}\right)$$

The percentage weight and particle size may then be graphically plotted as previously shown in Figure 8 of the drawings.

While the feed devices of this invention have been particularly described in connection with their use for introducing particles of the powder sample into the tower of gaseous sedimentation apparatus, it should be understood that the feed devices are not necessarily limited to such application. For example, the feed devices of this invention may be used to advantage under any circumstances where it is desired to produce a cloud of dispersed and deaggregated particles of a powder sample in a fluid medium. Such a cloud of particles might be produced in atmosphere by the feed devices of this invention, and the particles settling through the atmosphere may be collected on microscope slides for microscopic examination and counting in order to analyze a particle powder sample.

It should be obvious that various modifications of the gaseous sedimentation feed devices and apparatus of this invention will occur to those skilled in the art without departing from the spirit and scope of the appended claims.

I claim:

1. In an apparatus for analyzing the particle size distribution of a powder sample, a vertical gas-containing sedimentation tower, a powder injection conduit extending into the upper part of said tower, a powder supply conduit external to said tower and extending upward from said first conduit intermediate the ends thereof, the upper end of said supply conduit being open to receive a small quantity of powder constituting the sample to be analyzed, a valve in said supply conduit which may be opened to supply the powder sample to said injection conduit, said valve being thereafter closed to preclude passage of air, a source of pressurized gas connected to the end of said injection conduit external to said tower, a normally-closed valve in said injection conduit between said source and said supply conduit, whereby opening of the latter valve causes a blast of pressurized gas to impinge against the powder sample held by said injection conduit and effects forceful delivery of the powder sample through said injection conduit to the upper part of said tower, and means at the delivery end of said injection conduit within said tower for dispersing and deaggregating the powder sample, so as to form a cloud of powder particles free to gravitate downward within the sedimentation tower.

2. In an apparatus for analyzing the particle size distribution of a powder sample, a vertical gas-containing sedimentation tower, a powder injection conduit extending into the upper part of said tower, hopper means external to said tower and extending upward from said injection conduit intermediate the ends thereof, whereby a small quantity of powder constituting the sample to be analyzed may be introduced into said conduit through said hopper means, means for effecting pressure-tight closure of said hopper means after introduction of the powder sample, a source of pressurized gas connected to the end of said injection conduit external to said tower, a normally-closed valve in said injection conduit between said source and said hopper means, whereby opening of said valve causes a blast of pressurized gas to impinge against the powder sample held by said injection conduit and effects forceful delivery of the powder sample through said injection conduit to the upper part of said tower, and means at the delivery end of said injection conduit within said tower for dispersing and deaggregating the powder sample, so as to form a cloud of powder particles free to gravitate downward within the sedimentation tower.

3. Apparatus according to claim 2, wherein said dispersing and deaggregating means comprises a body member having a vertical downwardly flared conical opening, and a cone member positioned within said opening and forming with said body member a narrow passage or orifice to which the powder is supplied.

4. Apparatus according to claim 3, wherein said cone member is adjustable axially to vary the size of said passage or orifice.

5. Apparatus according to claim 3, wherein said members are constructed to form a vertical extension of the narrow passage or orifice so as to emit the powder particles vertically downward.

6. Apparatus according to claim 2, wherein said dispersing and deaggregating means comprises a fine mesh screen arranged in the path of travel of the forcefully delivered powder.

ROBERT E. PAYNE.

(References on following page)

REFERENCES CITED

The following references are of record in the file of this patent:

UNITED STATES PATENTS

| Number | Name | Date |
|---|---|---|
| 1,926,484 | Hoffmann | Sept. 12, 1933 |
| 2,080,884 | Anderson | May 18, 1937 |
| 2,117,845 | Hammack | May 17, 1938 |
| 2,120,003 | Schanz | June 7, 1938 |
| 2,274,521 | Berry | Feb. 24, 1942 |
| 2,352,677 | Anderson et al. | July 4, 1944 |
| 2,389,012 | Trist | Nov. 13, 1945 |
| 2,413,420 | Stephanoff | Dec. 31, 1946 |
| 2,421,183 | Cakebread | May 27, 1947 |